US009479998B2

(12) United States Patent
Birnbaum et al.

(10) Patent No.: US 9,479,998 B2
(45) Date of Patent: Oct. 25, 2016

(54) SYSTEMS AND METHODS FOR AUTHENTICATING DEVICES BY COMPLYING WITH WIRELESS GUIDELINES BASED ON DEVICE LOCATION

(75) Inventors: David Birnbaum, Modiin (IL); Guy Halperin, Haifa (IL); Adi Shaliv, Nir-Banim (IL); Eran Friedlander, Rehovot (IL)

(73) Assignee: Intel Corporation, Santa Clara, CA (US)

( * ) Notice: Subject to any disclaimer, the term of this patent is extended or adjusted under 35 U.S.C. 154(b) by 834 days.

(21) Appl. No.: 13/537,591

(22) Filed: Jun. 29, 2012

(65) Prior Publication Data

US 2014/0003606 A1    Jan. 2, 2014

(51) Int. Cl.
*H04L 29/06* (2006.01)
*H04W 48/04* (2009.01)
*H04W 4/02* (2009.01)
*H04W 12/06* (2009.01)

(52) U.S. Cl.
CPC .............. *H04W 48/04* (2013.01); *H04W 4/02* (2013.01); *H04W 12/06* (2013.01); *H04L 63/0823* (2013.01)

(58) Field of Classification Search
CPC .... H04L 63/0823; H04W 4/02; H04W 12/06
See application file for complete search history.

(56) References Cited

U.S. PATENT DOCUMENTS

| 7,860,516 B2* | 12/2010 | Hodges et al. ............ 455/456.1 |
| 2003/0008662 A1* | 1/2003 | Stern et al. .................. 455/456 |
| 2005/0198506 A1* | 9/2005 | Qi et al. ....................... 713/170 |
| 2012/0015690 A1* | 1/2012 | Miao .......................... 455/556.1 |

OTHER PUBLICATIONS

Peter Ecclesine, IEEE P802.11 Wireless LANs, Feb. 27, 2010, IEEE 802.11-10/0210r4, 15 pages.*

* cited by examiner

*Primary Examiner* — Jeffrey Pwu
*Assistant Examiner* — Thong Truong
(74) *Attorney, Agent, or Firm* — Sutherland Asbill & Brennan LLP

(57) ABSTRACT

Systems and methods are described herein for authenticating a user device that uses a wireless local area network, determining the location of the device, and complying with wireless guidelines based at least in part on the location. The user device may communicate with a location server to determine the user device's location. The user device will determine which wireless guidelines are applicable to that location and configure the wireless system or any device feature to comply with the guidelines. For example, some locations prohibit the operation of wireless devices with a frequency of greater than 5 GHz. If the location of the user device dictates compliance with that guideline, the user device will not transmit wireless signals with a frequency of greater than 5 GHz.

26 Claims, 7 Drawing Sheets

US 9,479,998 B2

SYSTEMS AND METHODS FOR AUTHENTICATING DEVICES BY COMPLYING WITH WIRELESS GUIDELINES BASED ON DEVICE LOCATION

TECHNICAL FIELD

This disclosure generally relates to systems and methods for using location authentication to comply with wireless regulatory standards.

BACKGROUND

Wireless networks have become a ubiquitous aspect of the radio frequency spectrum. As the spectrum has increased to handle larger amounts of wireless communications, the need to deconflict signals to reduce interference has become an important issue in certain parts of the world. Consequently, various countries or regions have adopted specific deconfliction requirements for wireless local area network devices. Accordingly, as users move between the regions, the operational features of their mobile devices may need to change based in part on their locations. Further, the operating locations of non-mobile devices may not be known at the time of manufacture or shipping from the original equipment manufacturer. Therefore, non-mobile devices may need to configured to comply with local deconfliction requirements when they are installed or relocated.

BRIEF DESCRIPTION OF THE FIGURES

The features within the drawings are numbered and are cross-referenced with the written description. Generally, the first numeral reflects the drawing number where the feature was first introduced, and the remaining numerals are intended to distinguish the feature from the other notated features within that drawing. However, if a feature is used across several drawings, the number used to identify the feature in the drawing where the feature first appeared will be used. Reference will now be made to the accompanying drawings, which are not necessarily drawn to scale and wherein.

DETAILED DESCRIPTION OF EMBODIMENTS OF THE INVENTION

Embodiments of the invention are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Embodiments described in this disclosure may provide systems, methods, and apparatus for an 802.11 peer-to-peer wireless local area network to avoid interfering with the transmissions of a non-802.11 device on an as needed basis. Mobile devices using various unlicensed communication frequency bands to engage in an 802.11 peer-to-peer wireless local area network connection can interfere with the transmissions of non-802.11 devices. For example, a non-802.11 device may be a radar system or satellite system that operates on a frequency greater than 5 GHz. One type of 802.11 peer-to-peer wireless local area network may include a laptop in wireless communication with an access point of a wireless local area network. The wireless local area network may also be operating at a frequency greater than 5 GHz. Hence, there is a possibility that the 802.11 and non-802.11 devices may interfere with each other. Accordingly, the 802.11h standard (See, IEEE 802.11 Standard, IEEE Std. 802.11-2007, published Mar. 8, 2007) states that any access point for a master-to-client wireless local area network should be able to detect the interference and avoid using that channel as needed. However, user devices may not be capable of supporting interference detection hardware. Accordingly, it would be advantageous to enable user devices to operate in those restricted frequency channels without having to add additional detection hardware and be able to avoid interfering with the non-802.11 devices on an as needed basis. In one embodiment, the non-802.11 device may be using communications channels with frequencies greater than 5 GHz. In another embodiment, the non-802.11 may use communications channels that may include Unlicensed National Information Infrastructure (UNII) channels 52-64 and 100-140.

Example embodiments of the invention will now be described with reference to the accompanying figures.

Figure 1:
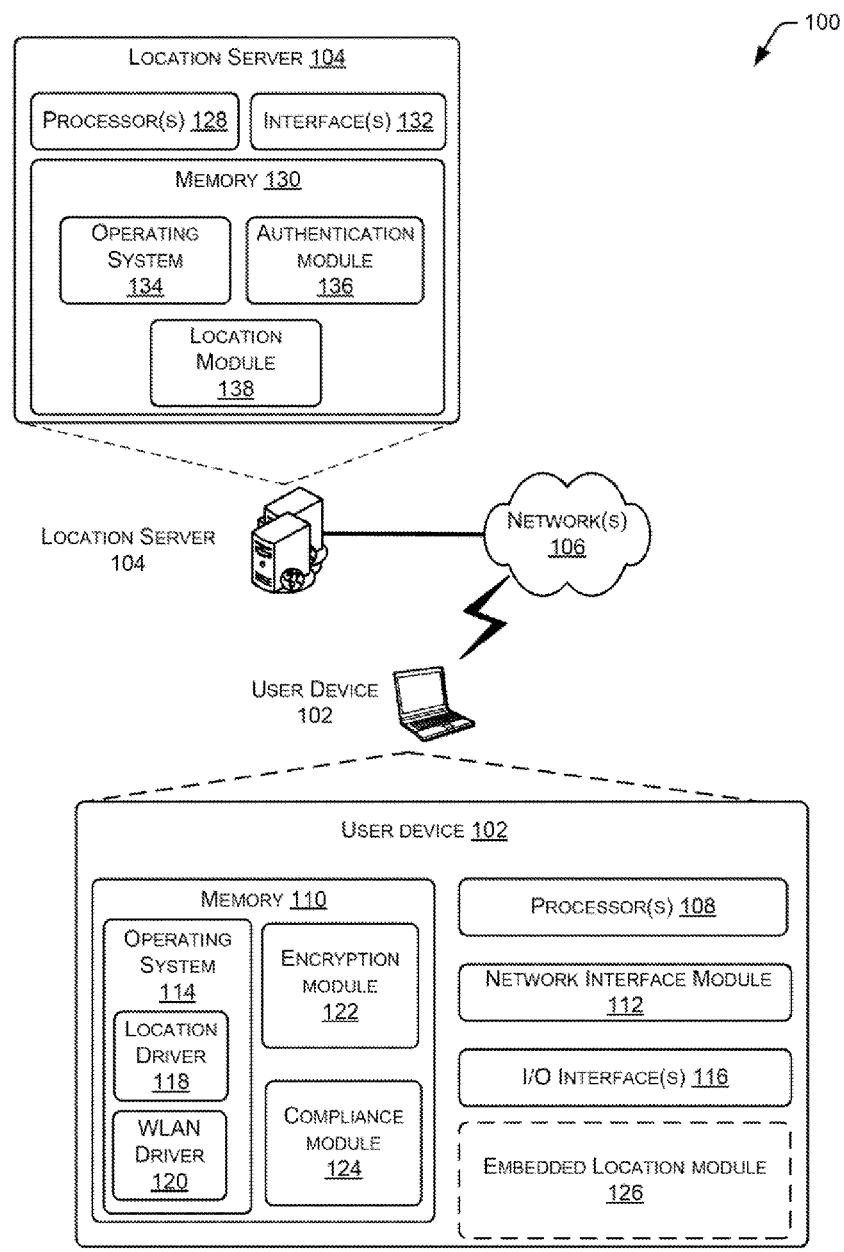
FIG. 1 is a block diagram of a representative environment of a wireless network including a user device and a location server that coordinate to comply with wireless network guidelines in accordance with one or more embodiments of the disclosure.

FIG. 1 is a simplified block diagram of a representative environment 100 that includes a user device 102 and location server 104 in electrical communication over a wireless network 106. At a high level, the user device 102 and the location server 104 may interact with each other to authenticate the identity of the user device 102 and to comply with local wireless network guidelines based in part on determining the location of the user device 102. The authentication and compliance systems and techniques will be introduced by the description of the individual devices with regard to FIG. 1.

In one embodiment, the user device 102 may include a computer processor 108 to execute computer-readable instructions stored in memory 110 that enable the device to execute instructions on the hardware, applications, or services associated with the user device 102. The one or more computer processors 108 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 102 may also include a chipset (not shown) for controlling communications between the one or more processors 108 and one or more of the other components of the user device 102. In certain embodiments, the user device 102 may be based on an Intel® Architecture system and the processor(s) 108 and chipset may be from a family of Intel® processors and chipsets, such as the Intel® Atom® processor family. The one or more processors 108 may also include one or more application-specific integrated circuits (ASICs) or application-specific standard products (ASSPs) for handling specific data processing functions or tasks.

Memory 110 may include an operating system 114 to manage and execute applications stored therein as well as other systems and modules within the user device 102. For example, the user device 102 may include an Input/Output (I/O) interface 116 that enables a user to view content displayed by the device or to interact with the user device 102 using various tactile responsive interfaces such as a keyboard, touch screen, or mouse. The operating system 114 may also include a location driver 118 and a Wireless Local Area Network (WLAN) driver 120. The memory 110 may be comprised of one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or combinations thereof.

The location driver 118 may be configured to manage an authentication and compliance process from the point of view of the user device 102. In one embodiment, the authentication process may broadly include an encryption portion, a communication portion, a verification portion, and an acknowledgement portion. The compliance process may broadly include a location determination, guideline verification, and guideline implementation. The location driver 118 may play a role in the encryption, communication, location determination, and acknowledgement portions. The compliance module 124 may play a role in the guideline verification and implementation portions.

The location driver 118 may generate or direct the encryption module 122 to generate an encryption key that may be shared with the location server 104 via a secure session. The type of encryption will be discussed in greater detail in the description of the encryption module 122. Then encryption key may be used to encrypt certain types of information that may be closely held by the network and not readily available or accessible to users outside the network. For example, the network administrators may assign a unique identifier to the user device 102 that is not related to typical identifying information that is readily exchanged or referenced in network communications. The identifier may not include typical identifying information such as an Internet Protocol (IP) address or a Media Access Control (MAC) address. However, the identifier may be composed of any numeric, alphanumeric, or data string that may be read by a computing device. When the identifier is encrypted, it may be referred to as the identification block. In another embodiment, one or more other bits of information may also be encrypted and included in the identification block to increase the complexity and make it more difficult to replicate or spoof the identification block. For example, one type of other information may include a time stamp associated with the creation of the identification block or a time stamp for any other operations performed by the user device. This may include a time stamp of when the encryption key was sent or any other operation that may be tracked or identified by the user device 102 and the location server 104. For example, the other information may be provided to the location server 104 and may be stored in memory and referenced when each new identification block is received from the user device 102. The location server 104 may determine if the other information is consistent with the stored information or if the other information has been updated in a way that is consistent with the previous information. For example, the location server 104 may determine that the time stamp has been incremented in a predictable way, such that the new time stamp in the identification block is later than the previous time stamp from a prior identification block.

With regard to the communication portion of the authentication process, the location driver 118 may also select which periodic messages may be appended with the identification block. The periodic message may be consistently chosen as a carrier of the identification block or the location driver 118 may randomize between different periodic messages in a manner that may be known to the location server 104. The randomization adds another level of complexity that may make it harder to replicate or spoof the authentication process. In one embodiment, the periodic message may include an encrypted portion and an unencrypted portion. The location server 104 may extract the encrypted portion, decrypt, and analyze the identification block. If the identification block is successfully authenticated, the location server 104 may provide an acknowledgment to the user device 102. In one embodiment, the acknowledgement may be an acknowledgement message, or the mere continuation of communication with the user device 102 may also be an acknowledgement of the authentication. For example, if the identification block is not authenticated, the network may stop communicating with the user device 102.

In another aspect of the authentication process, the location driver 118 may request a location determination from the location server 104. The location server 104 may respond to the query with a scan list that includes the location of the access points that have received signals from the user device 102. Accordingly, the location server 104 or the location driver 118 may determine the relative position of the user device 102. This may also include the geographical or physical location of the user device 102, such that the user device may know which country, state, region, province, county, street, and/or building where the user device 102 is located.

The WLAN driver 120 may be configured to control or direct the network interface module 112 to communicate with other devices over the network 106. This may include generating messages that are compliant with network protocols to exchange information efficiently and effectively per the Wi-Fi Direct Standard (See; Wi-Fi Direct specification published in October 2010) and/or the IEEE 802.11 wireless standard (See; IEEE 802.11-2007, published Mar. 8, 2007; IEEE 802.11n-2009, published October 2009) or a combination thereof. The standards may require that specific types of messages may be sent on a periodic or intermittent basis in order to comply with the standard. The WLAN driver 120 may manage and monitor this message traffic. Additionally, the location driver 118 may instruct the WLAN driver 120 to append, insert, or add the identification block to one or more of these periodic messages that are being sent to or directed to the location server 104 via the network interface module 112. Additionally, the location driver 118 may also request that the WLAN driver 120 initiate a secure session with the location server 104 to provide the encryption key.

The compliance process may take place after the authentication process has been completed. However, in another embodiment, the authentication process may not be required to be completed prior to starting the compliance process. At a high level, the compliance process is based on the user device 102 knowing or learning its location from the location server 104 or the location driver 118. Additionally, the compliance process also includes having access to one or more wireless network guidelines that may be applicable to one or more locations. Broadly, the wireless network guidelines may require, recommend, or request that wireless networks within a certain location comply with one or more operating procedures. The guidelines may include, but are not limited to, the IEEE 802.11 wireless standard, the Wi-Fi Direct Standard, or any other guideline that may be applicable to wireless communications or devices. In one example, under IEEE 802.11(h), the guidelines provide instructions on how to avoid interfering with satellite and radar signals from wireless local area network devices. Typically, the satellite or radars may be operating using frequencies greater than 5 GHz or communications channels that may include Unlicensed National Information Infrastructure (UNII) channels 52-64 and 100-140. To comply with 802.11(h), the wireless devices should not operate in these bands at any time or, in the alternative, the wireless devices should not operate in these bands when satellite and radar signals are detected. Accordingly, the ability to determine the location of the user device 102, verify which guidelines apply at that location, and configure and operate the user device 102 in compliance with the appropriate guidelines is desirable.

The memory 110 may also include a compliance module 124 that may implement the compliance portion of the user device 102. For example, the compliance module 124 may query the location driver 118 for the location of the user device 102 or any other module or memory where the location of the user device 102 may be stored. The compliance module 124 may store any relevant wireless network guidelines or may access the network 106 to locate one or more remote storage sites that may include the one or more guidelines that may be applicable to the user device 102. In one embodiment, the compliance module 124 may determine which features or operations should be enabled or disabled and configure the user device 102 accordingly. For example, if country A requires that wireless local area network devices do not operate in a frequency band of greater than 5 GHz, the compliance module 124 may configure or request that the network interface module 112 not transmit in that spectrum. In another embodiment, the user device 102 may move from country A to country B which permits operating in the 5 GHz spectrum. The location driver 118 may provide the new location to the compliance module 124 which, in turn, reconfigures or requests that the network interface module 112 operate in that spectrum. In certain instances, the location driver 118 may periodically determine the location of the user device 102 or may determine the location when the user device 102 is powered on.

The memory 110 may also include an encryption module 122 that may on its own or in conjunction with the location driver 118 encrypt information that may be included in the identification block. In one embodiment, the encryption techniques may follow a digital signature scheme that includes a public key associated with a plurality of private keys. In this way, each private key can generate a signature that can be verified using the group public key. Accordingly, a private key holder may not need to know each private key by using the general public key to do the decryption. Hence, the private key holders may remain anonymous. However, in other embodiments, any other type of encryption may be applicable to encrypt or decrypt the identification block.

The network interface module 112 may include a wireless system that may enable the user device 102 to communicate wirelessly with the other devices over the network 106. The wireless system may include the hardware and software to broadcast and receive messages either using the Wi-Fi Direct Standard (See; Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. The wireless system 122 may include a transmitter and a receiver or a transceiver (not shown) capable of operating in a broad range of operating frequencies governed by the IEEE 802.11 wireless standard. In certain instances, the compliance module 124 may direct the network interface module 112 to limit transmissions to certain frequency bands when the user device 102 is in a specific location.

The drivers and modules described above form one embodiment of the user device 102. However, in another embodiment, the user device 102 may also include an embedded location module 126 that may exist outside of the operating system 114 and the memory 110. This embodiment is distinct from the embodiments described above and highlighted by the dashed lines used to illustrate the embedded location module 126. For example, the embedded location module 126 may include its own processor (not shown) and memory (not shown) and may not need to rely on the processor 108 or the memory 110. In one embodiment, the embedded location module 126 may be implemented as a distinct chip set that operates independently of the operating system 114. In this way, the embedded location module 126 is isolated from the operating system 114 and the memory 110 to minimize the likelihood that the generation of the identification block is compromised by other applications stored in memory that may use the operating system 114 to infiltrate the network 106. For further protection, the embedded location module 126 may communicate directly with the network interface module 112 instead of using the WLAN driver 120. This additional isolation from the memory 110 provides additional protection against unauthorized applications residing in the memory 110. However, under certain conditions the embedded location module 126 may interact with the location driver 118 and pass information through the WLAN driver 120.

In one embodiment, the embedded location module 126 may generate the encryption keys used to encrypt the identification block. The keys may be provided to the location server 104 without accessing or using the operating system 114, the memory 110, the location driver 118, or the WLAN driver 120. The embedded location module 126 may generate the identification block using the unique identifier described above, a Session ID, a permanent MAC address, a time stamp, and/or a geographical location of the user device 102. After generating the identification block, the embedded location module 126 may append the identification block to one or more periodic messages being sent to the location server 104 via the network interface module 112.

Accordingly, the location server 104 may validate the identity and/or location of the user device 102 as will be described in greater detail below.

The location server 104 may enforce and/or monitor security policy requirements determined by the network administrators. In one aspect, the location server 104 may validate the identity of the devices on the network 106. In another aspect, the location server may validate the location of the user devices 102 on the network 106. The location server 104 may implement these embodiments using hardware, software, or a combination thereof.

The location server 104 may include one or more processors 128, a memory 130, and interface devices 132 to implement the aforementioned embodiments. The one or more processors 128 may individually comprise one or more cores and are configured to access and execute (at least in part) instructions stored in the one or more memories 130. The one or more memories 130 comprise one or more CRSMs as described above.

Similar to those described above, the one or more interfaces 132 allow for the coupling of devices such as displays, keyboards, storage devices, and so forth. Likewise, the one or more interfaces 132 may be configured to couple to the network 106.

The one or more memories 130 may store instructions for execution by the one or more processors 128 which perform certain actions or functions. These instructions may include an operating system 134 configured to manage hardware resources, such as the interfaces 132, and provide various services to applications executing on the one or more processors 128.

The memory 130 may also include an authentication module 136 and a location module 138 that may enforce and/or monitor security protocols on the network 106. In one embodiment, the authentication module 136 may receive the identification block from the user device 102. The identification block may be decrypted using the public group key provided by the user device 102. The decrypted information may include the unique identifier that may be assigned to the user device 102. The authentication module 136 may validate the unique identifier to determine the identity of the user device 102. In other embodiments, as noted above, the decrypted information may also include additional information that is associated with the user device 102 that provides additional evidence to support or disprove the identity of the user device 102. For example, the additional information may be a time stamp that has been associated with the user device. The time stamp may be an indication of when the identification block was created or when the user device 102 joined the network. These time stamp embodiments are merely examples and are not intended to limit the scope of the claims. The time stamp may be for any event or operation associated with the user device 102 or the location server 104. Additionally, in another embodiment, the decrypted information may include the geographical or physical location of the user device 102 as determined by the compliance module 124.

The location module 138 may validate the location information provided by the compliance module 124. The location module 138 may determine the location of the user device 102 using one or more access points (not shown) for the wireless portion of the network 106. For example, the location of the access points may be known and the location module 138 may be able to determine the location of the user device 102 based in part on signals strength or time of flight of the signals being sent from the user device 102 to the access points. In this way, the location module 138 may generate a scan list based on the location information gleaned from the access points (not shown) of the wireless local area network.

Figure 2:
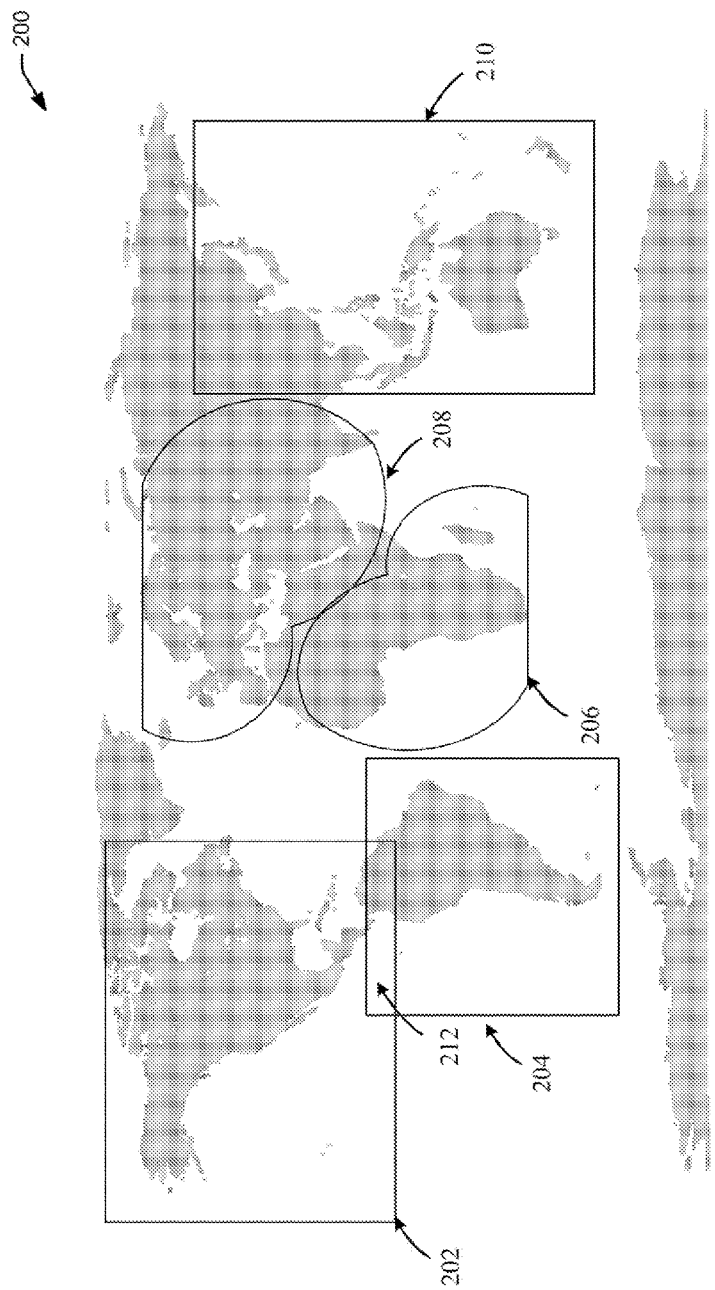
FIG. 2 is an illustration of regions where different wireless network guidelines are enforced in accordance with one or more embodiments of the disclosure.

FIG. 2 is an illustration of a map 200 indicating where different wireless network guidelines may be enforced. The map 200 of the world is for illustrative purposes and is not intended to reflect actual compliance areas for wireless network guidelines. However, the map 200 is intended to illustrate that different geographical areas may have different guidelines for wireless devices. For example, the regions 202, 204, 206, 208, 210 highlight which guidelines apply within each of the regions. For instance, the North American region 202 may operate under a first guideline and the South American region 204 may operate under a second guideline. Therefore, if the user device 102 is located within the North American region 202, the network interface module 112 may be configured to operate differently than if the user device 102 was located in the South American region 204. This may also be true for the European region 208, the African region 206, and the Asian region 210. However, each region is not required to be different from all the other regions. In fact, the regions may share the same compliance requirements.

In another embodiment, the regions 202, 204 may overlap to form another region 212. In this region 212, the compliance module 124 will comply with the more restrictive guidelines so that the user device 102 may operate in compliance within both regional guidelines. However, if the regional guidelines are inconsistent, the compliance module 124 may inform the user to select which guidelines should be followed or ignored.

Figure 3:
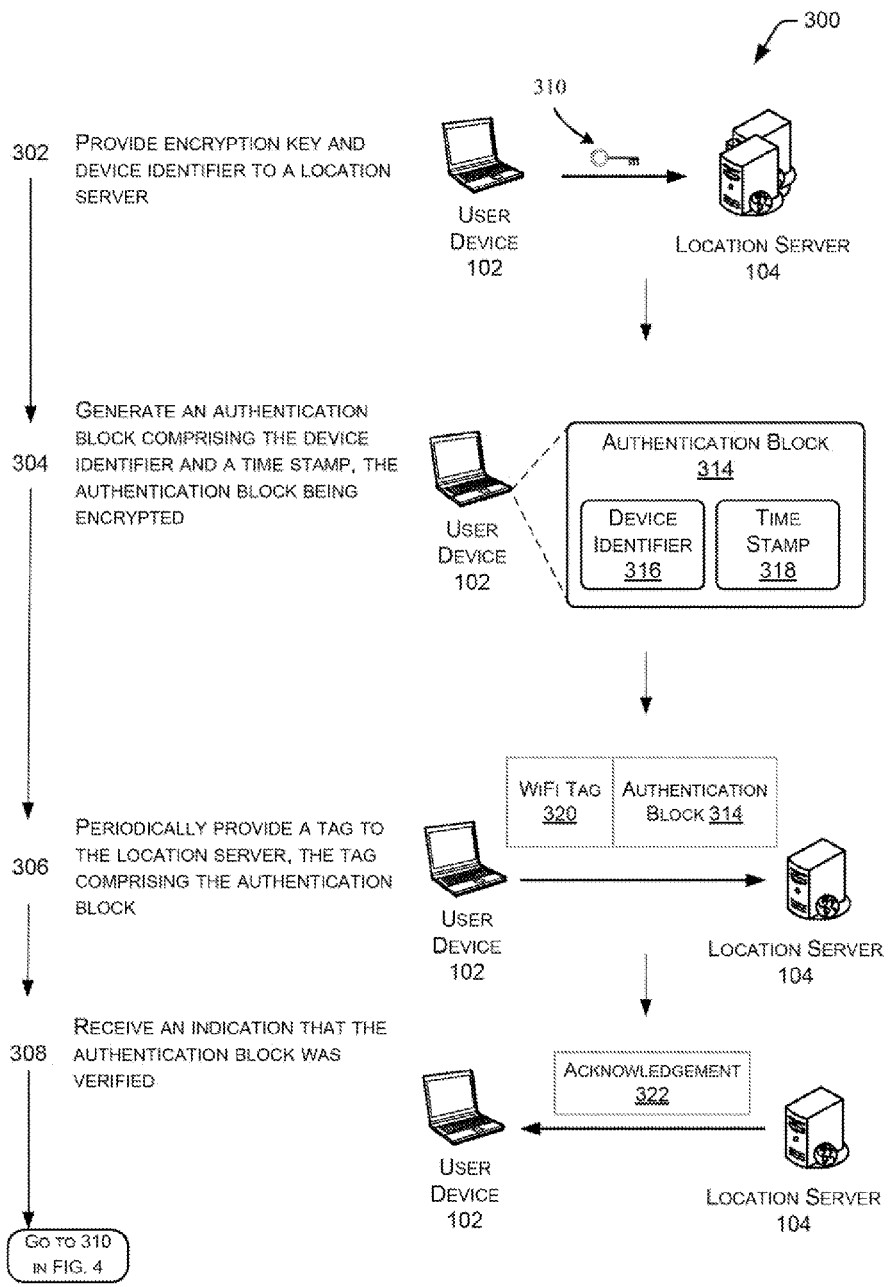
FIGS. 3 and 4 are a flow diagram for determining the location of a user device and enabling or disabling features of the wireless system of the user device based at least in part on the location of the user device in accordance with one or more embodiments of the disclosure.
Figure 4:
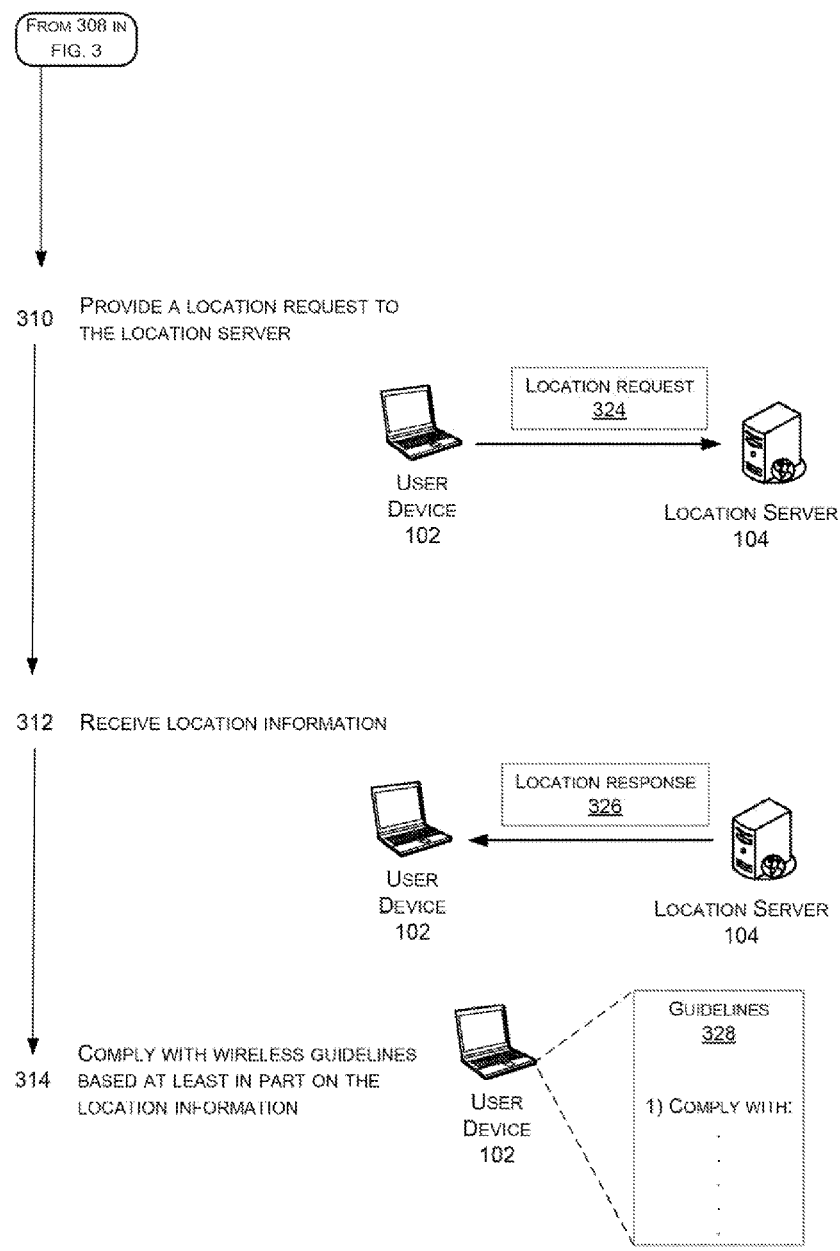

FIGS. 3 and 4 illustrate a flow diagram 300 for authenticating a user device 102 by attaching a block of encrypted data to unsecured messages sent over a wireless network 106 to a location server 104, receiving the location information, and complying with wireless network guidelines based at least in part on the location.

At block 302, the user device 102 may provide the encryption key 310 and device identifier to the location server 104. This may be accomplished via a secure sessions that is initiated by the user device 102 to securely transfer the encryption key 310.

At block 304, the user device 102 may generate an identification or authentication block 314 comprising a device identifier 316 and/or a time stamp 318 in this embodiment. As noted above in FIG. 1, the authentication block 314 may include a variety of other information that may be used to increase the level of complexity to make it more difficult to compromise. Additionally, the authentication block 314 may also be encrypted using the encryption key 310. The information may include, but is not limited to, time stamps related to any operation or function performed by the user device 102 or provided by the location server 104. The information may also include scan lists provided by the location server 104 that indicate the location of the user device 102 as determined by the location server 104 based at least in part on signals received by the access points (not shown).

At block 306, the user device 102 may periodically provide a Wi-Fi tag 320 or message to the location server 104 during the normal course of operations. For example, the Wi-Fi tag 320 may be any message that is periodically transmitted over the wireless network 106 to comply with the 802.11 Wireless Communications Standard or any other standard or protocols that may send periodic messages over the wireless network during normal operations.

At block 308, the user device 102 may receive an indication that the authentication block 314 was validated or verified by the location server 104. In one embodiment, the location server 104 may send an acknowledgement message 322 indicating the authentication block 314 was used successfully to verify the identity of the user device 102. In another embodiment, the location server 104 may indicate acknowledgement by merely continuing to communicate normally with the user device 102.

At block 310, the user device 102 may provide a location request 324 to the location server 104. The location request 324 may indicate the type of location information that is needed to make a guidelines compliance decision. For example, the location could be for a country, a state, a county, a street address, or a location within a building (e.g., floor or office number). The guidelines may apply broadly to the country but may also be site specific down to a location within a building such as a floor or office number.

At block 312, the location server 104 may provide a location response 326 to the location request 324. As noted above in FIG. 1, the location of the user device 102 may be determined by the location of the access points that are in communication with the user device. Based at least in part on measuring the signal strength and the time of flight of the signals received at the access points, the location server 104 may be able to determine the physical location of the device to within a few feet in some circumstances. More broadly, the location server 104 should be able to discern the country, state, or city in which the user device 102 resides using the same access point information. The response may be in the form of a scan list that includes the access point information. In another embodiment, the location response 326 may indicate the country, state, or city if the location request 324 specifies the information.

At block 314, the user device 102 may use the location information and compare it to the guidelines 328 that are stored in the memory 110 or accessed over the network 106. If the location corresponds to certain restrictions or limitations in the guidelines 328, the compliance module 124 may reconfigure the user device 102 in a manner that enables compliance with the guidelines 328. However, if one or more guidelines are inconsistent with each other, the compliance module 124 may query the user to determine which guidelines should be followed or ignored.

Figure 5:
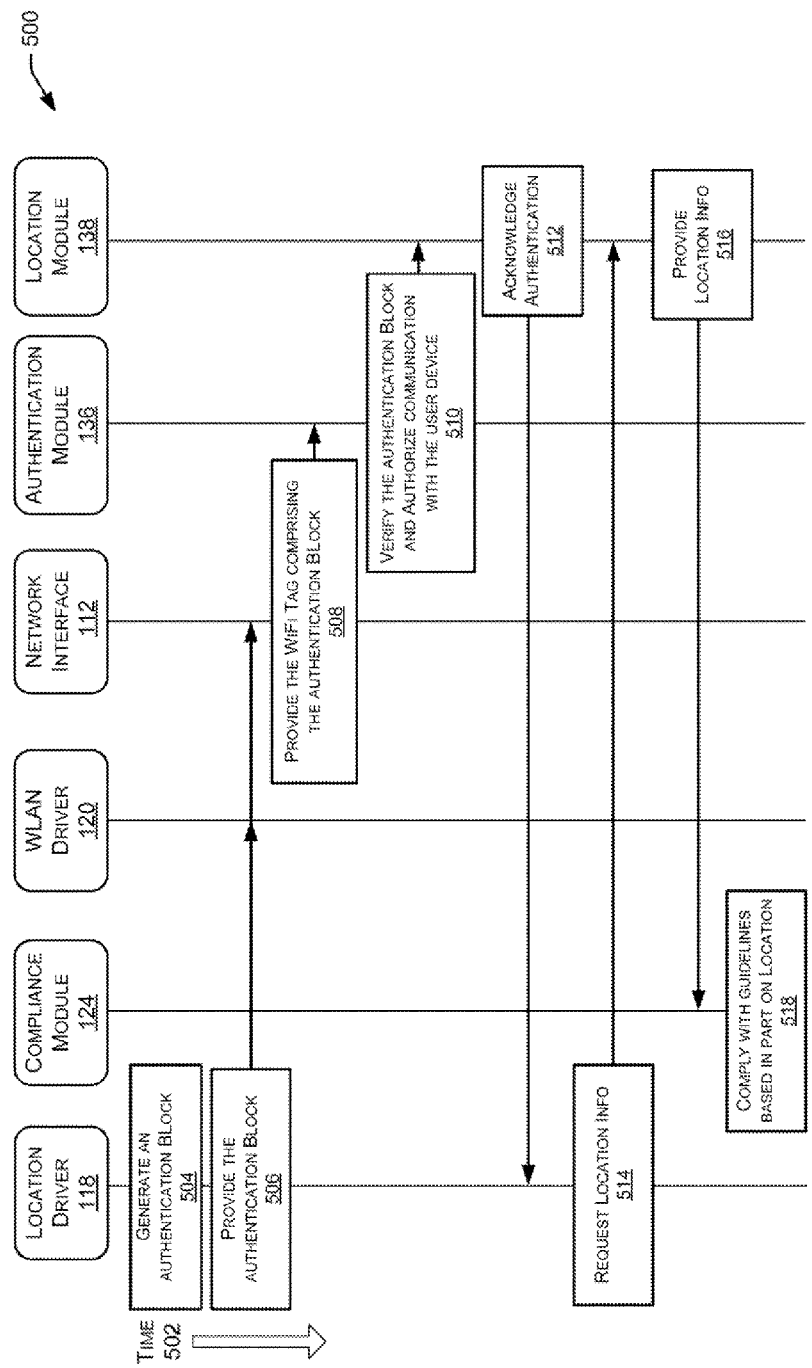
FIG. 5 is a flow diagram illustrating several interactions between various modules to comply with wireless network guidelines based at least in part on the location of the user device in accordance with one or more embodiments of the disclosure.

FIG. 5 is a flow diagram 500 illustrating several interactions between various modules to implement the authentication and location determination of a user device 102 in conjunction with the location server 104. The flow diagram 500 shows a time axis 502 indicating the relative sequencing of these events for this embodiment. It should be noted that in other embodiments, the sequencing may be altered and some modules may be omitted. The description of FIG. 5 below is for one embodiment and additional embodiments may use different steps and sequencing to authenticate the user device 102.

At block 504, the location driver 118 may generate the authentication block 314 that may include the unique device identifier 316 and/or time stamp 318. As noted above in FIG. 1, additional information may be included in the authentication block 314 to make it harder to compromise the security of the authentication block 314 by unauthorized users.

At block 506, the location driver 118 may provide the authentication block 314 to the WLAN driver 120, which in turn will provide the authentication block 314 to the network interface module 112. In another embodiment, the location driver 118 may provide the authentication block 314 directly to the network interface module 112.

At block 508, the network interface module 112 may append the authentication block 314 to a WiFi tag 320 to the location server 104, as shown in FIG. 3. In another embodiment, the WLAN driver 120 may combine the WiFi tag message 320 and the authentication block 314 and provide it to the network interface module 112 for transmission to the location driver 118.

At block 510, the authentication module 136 may extract the authentication block 314 from the WiFi tag 320 and decrypt the authentication block using the encryption key 310. The authentication module 136 may verify the decrypted unique identifier and/or any other information included in the authentication block 314 that is associated with the user device 102. The authentication module 136 may provide an indication of a successful authentication to the location module 138.

At block 512, the location module 138 may provide location information (e.g., scan list) based at least in part on receiving the indication of a successful authentication. In another embodiment, the location driver 118 may acknowledge the successful authentication by continuing to communicate with the user device 102 after verifying the user device's 102 identity. The acknowledgement may be made using a message that explicitly confirms the acknowledgement or the acknowledgement may be made by merely continuing to communicate with the user device 102.

At block 514, the location driver 118 may request the location of the user device 102 from the location module 138. The location module 138 may determine the location of the user device 102 based at least in part on obtaining a scan list of the access points of the wireless network that is receiving signals from the user device 102. The scan list may also include the signal strength and the time the signals were received by the access points. Using this data, either the location server 104 or the user device 102 may determine the position of the user device 102 relative to the access points which are at known locations. Accordingly, the location of the user device 102 may be known to the country, state, city, address, or location within a building to within a few feet of the actual physical location.

At block 516, the location module 138 may provide the scan list to the compliance module 124 or the location driver 118 to determine the location. However, in another embodiment, the location module 138 may provide a specific location based on the type of location request received from the user device 102. For example, if the user device 102 requests the location based on country, state, city, or address, the location module 138 will provide a corresponding response that includes the requested information. Therefore, the user device 102 may not have to determine its location based on a scan list alone. The location module 138 may give a specific location ranging from a location based on the continent or country to the physical address or location within a building.

At block 518, the compliance module 124 may use the location information to determine which guidelines may be relevant to configuring the user device 102. In one embodiment, the compliance module 124 may determine that the IEEE 802.11(h) is relevant to operating in its location. Specifically, the guidelines may recommend to not transmit on frequencies greater than 5 GHz. Accordingly, to comply with IEEE 802.11(h), the compliance module 124 may configure the network interface module 112 to prevent transmissions greater than 5 GHz and/or to receive transmissions greater than 5 GHz. In another embodiment, a network administrator may create guidelines to limit the use of wireless access outside of business hours. For example, a company may want to limit security breaches during non-business hours by not allowing user devices 102 to be able to communicate wirelessly during these times. Accordingly, the compliance module 124 may instruct the network interface module 112 to not transmit during these times. In another embodiment, the network administrator for the user device 102 may not want to limit transmissions within a certain frequency band within the workplace due to business related activities that may interfere with wireless communications. The network administrator may generate internal guidelines that limit the transmission on certain frequencies or channels that reduce interference within the work environment. For example, the user devices 102 that are within proximity of the interference source may be instructed to avoid certain operating conditions while other user devices 102 that may not be affected by the interference may operate without restriction. In this way, the compliance module 124 may recognize and implement guidelines created by the network administrators in addition to the wireless standards generated by wireless governing or standards bodies.

Figure 6:
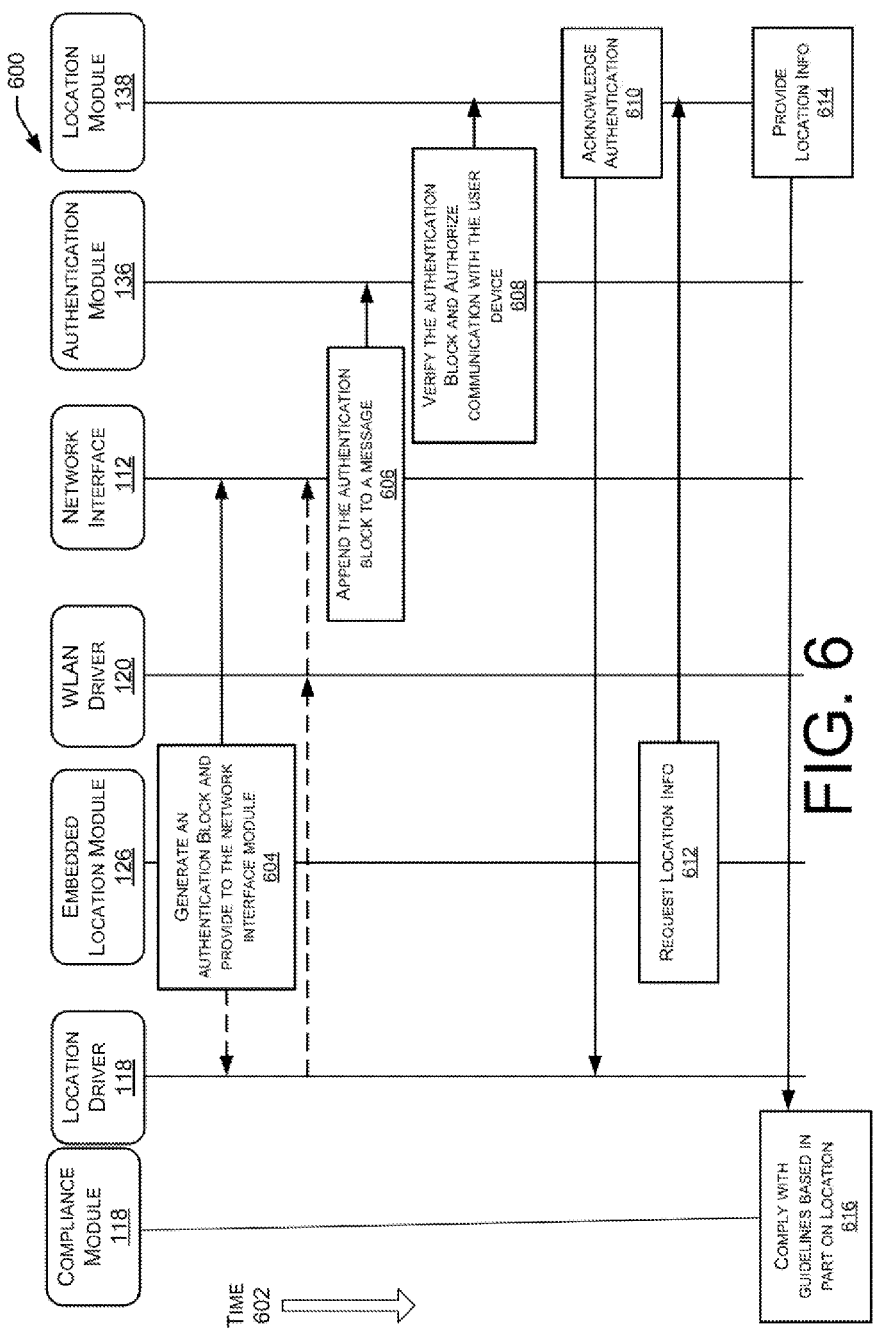
FIG. 6 is a flow diagram illustrating several interactions between various modules to comply with wireless network guidelines based at least in part on the location of the user device in accordance with one or more embodiments of the disclosure.

FIG. 6 is a flow diagram 600 illustrating several interactions between various modules and the embedded location module 126 used to implement the authentication of a user device 102. The flow diagram 600 shows a time axis 602 indicating the relative sequencing of these events for this embodiment. It should be noted that in other embodiments, the sequencing may be altered, and some modules may be omitted. The description of FIG. 6 below is for one embodiment, and additional embodiments may use different steps and sequencing to authenticate the user device 102.

At block 604, in one embodiment, the embedded location module 126 may generate an authentication block 314 that includes encrypted information associated and/or unique to the user device 102. In another embodiment represented by the dashed lines, the embedded location module 126 may generate the authentication block 314 and route the authentication block 314 through the location driver 118 and the WLAN driver 120 to the network interface module 112.

At block 606, the network interface module 112 may receive the authentication block 314 and attach the authentication block 314 to an outgoing message that may be routed to the location driver 118.

At block 608, the authentication module 136 may receive the message and extract the authentication block 314. The identity of the user device 102 may be authenticated by decrypting the authentication block 314 and verifying that the decrypted information is consistent with the information stored on the location server 104 that is associated with the user device 102. This may include an identifier, a time stamp, or any other type of fingerprint or signature information associated with the user device 102.

At block 610, the location module 138 may be informed of a successful user device 102 authentication and may provide an acknowledgement message to the user device 102.

At block 612, the embedded location module 126 may provide a location request to the location module 138. The request may include a request for a scan list, geographic coordinates, country/state/city/address location, and/or location (e.g., floor, office number) within a building.

At block 614, the location module 138 may respond to a location request from the user device 102. The response to the location request may include an access point scan list that includes a list of the access points that are receiving signals from the user device 102. Based on the strength and time of flight for the signals from the user device 102, the location of the user device 102 may be determined relative to the locations of the access points. The access points are assumed to be in known locations.

In one embodiment, if the user device 102 is moved, the scan list may be altered enough to determine that the user device 102 is no longer in the same location based on a comparison between the scan lists compiled at different times. Accordingly, the location module 138 may determine that the location of the user device 102 has changed and if the location change is outside of where the user device 102 is expected to reside. If the user device 102 is in an unexpected location, the location server 104 may terminate communications with the user device 102 and notify the network administrator. However, if the user device 102 is in an expected location, the location server 104 may respond to the scan list request or continue interacting with the user device 102 as intended.

At block 616, when the location information is received at the user device 102, the compliance module 124 may determine which guidelines are applicable to the current location of the user device 102. The compliance module 124 may choose from wireless standards bodies (e.g., IEEE 802.11, Wi-Fi Direct), governmental agencies (e.g., Federal Communications Commission, State/Local regulations), and/or network administration protocols. These guidelines may request, but are not limited to, limiting transmissions to certain frequency bands or channels, time windows for sending and receiving transmissions, and/or changing or altering any configurable function or operation performed by the user device 102.

Figure 7:
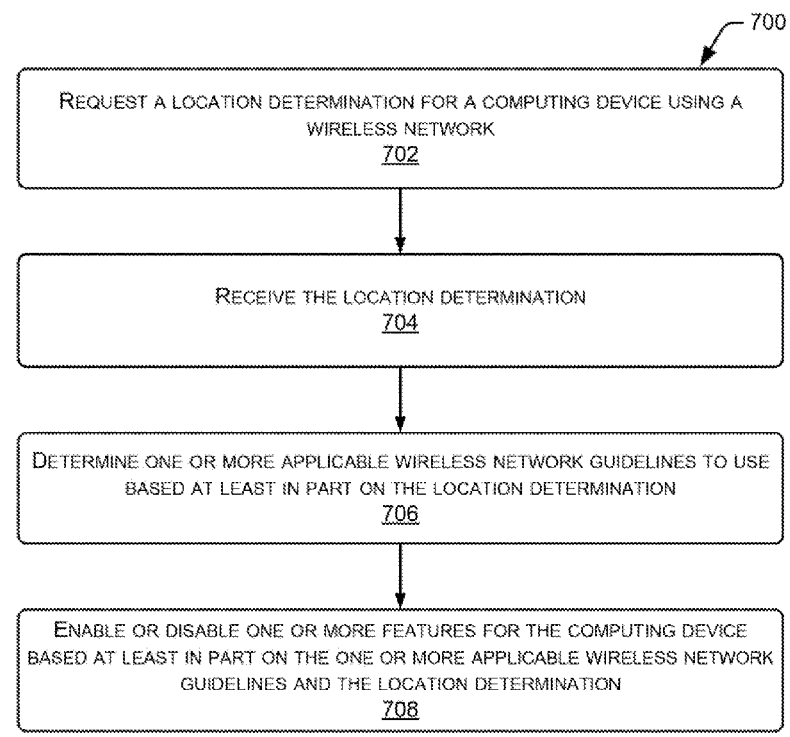
FIG. 7 is a flow diagram illustrating an exemplary method to comply with wireless network guidelines based at least in part on the location of the user device in accordance with one or more embodiments of the disclosure.

FIG. 7 is a flow diagram 700 illustrating an exemplary method for complying with guidelines by a user device 102 based at least in part on the location of the user device 102.

At block 702, the user device 102 provides a request for a location determination from the location server 104. The user device 102 may access a network 106 via wireless communication with one or more access points associated with a wireless local area network that is part of the network 106. The access points may determine the strength and timing of the signals received from the user device 102 and may provide the signal information to the location server 104. In one embodiment, the location server 104 may compile the signal information into a scan list. In another embodiment, the location server 104 may use the signal information to determine the location of the user device 102 based at least in part on the signal information and the known location of the access points.

At block 704, the user device 102 may receive the scan list information or the location information (e.g., country, state, city, address, office number). In one embodiment, the user device 102 may determine its location based on the known location of the access points included in the scan list. In one instance, the known locations of the access points may enable the user device 102 to determine the country, state, city, and/or address of its location. Alternatively, the user device 102 may use the signal information and the known access point locations to determine a more precise location that may include the floor number of a building or an office number of a building in which the user device 102 is located.

At block 706, the user device 102 may determine which guidelines to use based on the location information provided by the location server 104. The guidelines may be country, state, city, address, and/or specific location or any combination thereof. For example, certain guidelines may be specific to a region (e.g., country, state) in which a first set of guidelines may be applicable. At the same time, there may be a second set of guidelines for a specific location (e.g., address, building, office number) that may also impact the functionality of the user device 102. Generally, the user device 102 may attempt to comply with each set of guidelines. However, if the guidelines are in conflict with each other, then the user may be prompted to resolve the conflict via a user interface display. Additionally, the user device 102 may predetermine or receive a priority for the guidelines. In this way, the user device 102 can automatically resolve conflicts between the guidelines. For example, the user device 102 may receive information that the IEEE 802.11 guidelines have priority over the network administration guidelines. In another instance, government guidelines may be given priority over IEEE 802.11 guidelines and the network administration guidelines. For example, the government guidelines may request that any user device 102 may not transmit a signal with a frequency of greater than 5 GHz. The IEEE 802.11(h) guidelines may indicate that transmissions above 5 GHz may be used as long as other signals with a frequency of 5 GHz are not detected. In this case, based on the higher priority assigned to the government guidelines, the user device 102 will not transmit any signals greater than 5 GHz, regardless of whether conflicting signals are detected.

At block 708, the user device 102 may enable or disable one or more features based on the guidelines determination discussed immediately above. For example, the user device 102 may restrict or limit the frequency of outgoing transmissions to comply with governmental or IEEE guidelines. In another example, the user device 102 may restrict or limit transmissions to occur within a certain time window to comply with network administration guidelines.

CONCLUSION

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions, which have been employed herein, are used as terms of description and not of limitation. In the use of such terms and expressions, there is no intention of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A device comprising:
one or more memories comprising an operating system that includes one or more processor-executable instructions;
a processor to implement the operating system by executing the one or more computer executable instructions;
a location driver module of the operating system to:
cause to receive a scan list comprising a location of at least one access point;
determine the location of the device, based at least in part on the location of the at least one access point relative to the location of the device; and
generate an authentication block comprising:
an identifier of the device, the location of the device, and a time stamp corresponding to when the authentication block is generated; and
a compliance module to receive the location and to comply with wireless network guidelines and wireless regulatory guidelines based at least in part on the location, wherein:
the wireless regulatory guidelines have priority over the wireless network guidelines, and
the wireless network guidelines comprise transmission frequency limitations to a frequency band based at least in part on one or more interfering signals.

2. The device of claim 1, further comprising:
an encryption module to generate an encrypted authentication block;
a network interface module to incorporate the encrypted authentication block into an unencrypted periodic message provided to a wireless network; and an encryption key module to generate one or more encryption keys to encrypt the authentication block and provide the one or more encryption keys to a location server.

3. The device of claim 2, further comprising a wireless local area network driver of the operating system to establish a secure connection to the location server using the network interface module, wherein the encryption key module uses the secure connection to provide the one or more encryption keys.

4. The device of claim 1, wherein the frequency band comprises greater than 5 gigahertz.

5. The device of claim 1, wherein the frequency band comprises Unlicensed National Information Infrastructure channels 52-64 and 100-140.

6. The device of claim 1, wherein the frequency band comprises a frequency band for providing voice communications.

7. The device of claim 1, wherein the request for the location comprises a request for an authenticated scan list of access points of a wireless network.

8. The device of claim 1, wherein the request for the location comprises a request for a country or a region name associated with the location of the device.

9. A device comprising:
one or more memories comprising an operating system that includes one or more processor-executable instructions;
a processor to implement the operating system by executing the one or more processor-executable instructions;
an embedded location module comprising a microcontroller and embedded memory to store processor-executable instructions that are executable on the microcontroller to:
cause to receive a scan list comprising a location of at least one access point; determine the location of the device, based at least in part on the location of the at least one access point relative to the location of the device; and
generate an authentication block based at least in part on the location information, an identifier of the device, and a time stamp corresponding to when the authentication block is generated; and
a regulatory module to receive the location information and to comply with wireless regulatory rules associated with a location of the device, and wireless network guidelines, wherein:
the wireless regulatory rules comprise limiting transmissions by the device to a time window, and
the wireless network guidelines comprise transmission frequency limitations to the frequency band based at least in part on one or more interfering signals.

10. The device of claim 9, wherein the wireless regulatory rules comprise transmission frequency limitations to a frequency band.

11. The device of claim 10, wherein the frequency band comprises greater than 5 gigahertz.

12. The device of claim 10, wherein the frequency band comprises Unlicensed National Information Infrastructure channels 52-64 and 100-140.

13. The device of claim 9, wherein the embedded location module directly provides the authentication block the network interface module and a microcontroller that operates independently of the operating system.

14. The device of claim 9, further comprising:
an encryption module to generate an encrypted authentication block;
a network interface module to incorporate the encrypted authentication block into an unencrypted periodic message provided to a network; and
an encryption key module to generate one or more encryption keys to encrypt the authentication block and provide the one or more encryption keys to a location server.

15. A method comprising:
requesting a location determination for a computing device using a wireless network interface device that can communicate with an access point of a wireless local area network;
receiving the location determination using the wireless network interface device;
determining, using a processor, two or more applicable wireless network guidelines to use based at least in part on the location determination, wherein the two or more applicable wireless network guidelines comprise transmission frequency limitations to a frequency band based at least in part on one or more interfering signals;
determining a conflict between the two or more applicable wireless network guidelines;
resolving the conflict using respective priorities associated with the two or more applicable wireless network guidelines;
disabling or enabling one or more features of a computing device based at least in part on the two or more applicable wireless network guidelines stored in memory and the location determination; and
generating an authentication block comprising:
an identifier of the device, the location of the device, and a time stamp corresponding to when the authentication block is generated.

16. The method of claim 15, further comprising:
requesting a secure session with the location server;
providing an encryption key to the location server via the secure session;
generating an encrypted identification block comprising an identifier for the computing device and an element associated with the identification block using a processor;
appending the encrypted identification block with a recurring message comprising an unencrypted portion;
providing the recurring message comprising an encrypted portion and the unencrypted portion to a location server using a wireless network interface device; and
receiving an authentication acknowledgment of the encrypted portion of the recurring message at the computing device.

17. The method of claim 15, wherein the disabling of the one or more features comprises preventing frequency transmissions of greater than 5 Gigahertz from the computing device.

18. The method of claim 15, wherein the disabling of the one or more features comprises preventing frequency transmissions on Unlicensed National Information Infrastructure channels 52-64 and 100-140.

19. The method of claim 15, wherein the request of the location determination is generated by an operating system stored in memory of the computing device.

20. The method of claim 15, wherein the request of the location determination is generated by an embedded chip set comprising a microcontroller and a first memory in the computing device comprising a second memory that includes an operating system.

21. One or more non-transitory tangible computer-readable storage media comprising computer-executable instructions operable to, when executed by at least one computer processor, enable the at least one computer processor to implement a method comprising:
   requesting a location determination for a computing device using a wireless network interface device that can communicate with an access point for a wireless local area network;
   receiving the location determination using the wireless network interface device;
   determining, using a processor, two or more applicable wireless network guidelines to use based at least in part on the location determination, wherein the two or more applicable wireless network guidelines comprise transmission frequency limitations to a frequency band based at least in part on one or more interfering signals;
   determining a conflict between the two or more applicable wireless network guidelines;
   resolving the conflict using respective priorities associated with the two or more applicable wireless network guidelines; and
   disabling or enabling one or more features of a computing device based at least in part on the two or more applicable wireless network guidelines stored in memory and the location determination; and
   generating an authentication block comprising:
   an identifier of the device, the location of the device, and a time stamp corresponding to when the authentication block is generated.

22. The one or more non-transitory tangible computer-readable storage media of claim 21, further comprising:
   requesting a secure session with the location server;
   providing an encryption key to the location server via the secure session;
   generating an encrypted identification block comprising an identifier for the computing device and an element associated with the identification block using a processor;
   appending the encrypted identification block with a recurring message comprising an unencrypted portion;
   providing the recurring message comprising an encrypted portion and the unencrypted portion to a location server using a wireless network interface device; and
   receiving an authentication acknowledgment of the encrypted portion of the recurring message at the computing device.

23. The one or more non-transitory tangible computer-readable storage media of claim 21, wherein the disabling of the one or more features comprises preventing frequency transmissions of greater than 5 Gigahertz from the computing device.

24. The one or more non-transitory tangible computer-readable storage media of claim 21, wherein the disabling of the one or more features comprises preventing frequency transmissions on Unlicensed National Information Infrastructure channels 52-64 and 100-140.

25. The one or more non-transitory tangible computer-readable storage media of claim 21, wherein the request of the location determination is generated by an operating system stored in memory of the computing device.

26. The one or more non-transitory tangible computer-readable storage media of claim 21, wherein the request of the location determination is generated by an embedded chip set comprising a microcontroller and a first memory in the computing device comprising a second memory that includes an operating system.

* * * * *